United States Patent
Tsutsumi et al.

(10) Patent No.: US 9,870,876 B2
(45) Date of Patent: Jan. 16, 2018

(54) ENERGY STORAGE DEVICE AND CONDUCTIVE MEMBER

(71) Applicant: GS Yuasa International Ltd., Kyoto-shi (JP)

(72) Inventors: Masakazu Tsutsumi, Kyoto (JP); Jun Nakamura, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 644 days.

(21) Appl. No.: 13/910,020

(22) Filed: Jun. 4, 2013

(65) Prior Publication Data
US 2013/0330602 A1 Dec. 12, 2013

(30) Foreign Application Priority Data
Jun. 12, 2012 (JP) .................................. 2012-133079

(51) Int. Cl.
*H01G 11/70* (2013.01)
*H01M 4/70* (2006.01)
(Continued)

(52) U.S. Cl.
CPC ............. *H01G 11/70* (2013.01); *H01G 11/74* (2013.01); *H01G 11/82* (2013.01); *H01M 2/06* (2013.01);
(Continued)

(58) Field of Classification Search
CPC .......... H01M 2/30; H01M 4/70; H01M 2/302; H01M 2/305; H01M 2/06; H01M 2/22;
(Continued)

(56) References Cited

U.S. PATENT DOCUMENTS 2,019,823 A * 11/1935 Lewis ..................... H01M 2/20
429/122
2,058,787 A * 10/1936 Greger .................. H01M 2/305
429/97
(Continued)

FOREIGN PATENT DOCUMENTS

CN 201562721 U 8/2010
CN 102255058 A 11/2011
(Continued)

OTHER PUBLICATIONS

Horino et al., Machine translation of JP 2012-033395 A , originally published Feb. 2012, obtained from JPO website.*
(Continued)

*Primary Examiner* — Milton I Cano
*Assistant Examiner* — Jennifer A Moss
(74) *Attorney, Agent, or Firm* — McGinn IP Law Group, PLLC.

(57) ABSTRACT

A energy storage device includes: an electrode assembly that includes a positive electrode plate and a negative electrode plate, the positive electrode plate and the negative electrode plate being mutually insulated; a case that houses the electrode assembly; and a conductive member electrically coupled to the electrode assembly in the case. The conductive member includes a main body part that has a central axis in a direction passing through a wall surface of the case, and a conductive connection part that protrudes from the main body part in a direction intersecting with the central axis. The main body part includes a swage portion disposed at one end portion of the main body part and inserted into the wall surface of case, and a non-circular head disposed at another end portion of the main body part.

10 Claims, 9 Drawing Sheets

(51) Int. Cl.
*H01M 2/30* (2006.01)
*H01M 2/06* (2006.01)
*H01G 11/74* (2013.01)
*H01G 11/82* (2013.01)
*H01M 2/22* (2006.01)
*H01M 2/20* (2006.01)
*H01M 10/052* (2010.01)
*H01M 10/34* (2006.01)

(52) U.S. Cl.
CPC .............. *H01M 2/22* (2013.01); *H01M 2/30* (2013.01); *H01M 2/302* (2013.01); *H01M 2/305* (2013.01); *H01M 4/70* (2013.01); *H01M 2/202* (2013.01); *H01M 10/052* (2013.01); *H01M 10/345* (2013.01); *H01M 2220/20* (2013.01); *H01M 2220/30* (2013.01); *Y02E 60/122* (2013.01); *Y02E 60/124* (2013.01); *Y02E 60/13* (2013.01); *Y02P 70/54* (2015.11)

(58) Field of Classification Search
CPC ....... H01M 2/202; H01G 11/70; H01G 11/82; H01G 11/74
See application file for complete search history.

(56) References Cited

U.S. PATENT DOCUMENTS

| | | | | |
|---|---|---|---|---|
| 2,481,558 A | * | 9/1949 | Appel | H01M 2/0242 429/161 |
| 2,608,596 A | * | 8/1952 | White | H01M 2/0242 429/91 |
| 9,306,203 B2 | * | 4/2016 | Guen | H01M 2/30 |
| 2010/0047686 A1 | * | 2/2010 | Tsuchiya | H01M 2/202 429/178 |
| 2011/0281155 A1 | | 11/2011 | Ito et al. | |

FOREIGN PATENT DOCUMENTS

| | | | | |
|---|---|---|---|---|
| EP | 2472643 A1 | * | 7/2012 | ......... H01M 2/0426 |
| JP | 2003-92103 A | | 3/2003 | |
| JP | 2003-157812 A | | 5/2003 | |
| JP | 2004-186060 A | | 7/2004 | |
| JP | 2009087728 A | * | 4/2009 | |
| JP | 2010-097764 A | | 4/2010 | |
| JP | 2012033395 A | * | 2/2012 | |

OTHER PUBLICATIONS

Matsui et al., Machine translation of JP 2009-087728 A, originally published Apr. 2009, obtained from JPO website.*

Notification of Reasons for Refusal dated Apr. 14, 2016 with an English translation.

* cited by examiner

ENERGY STORAGE DEVICE AND CONDUCTIVE MEMBER

CROSS-REFERENCE TO RELATED APPLICATION

This application is based on Japanese Patent Applications No. 2012-133079 filed with the Japan Patent Office on Jun. 12, 2012, the entire contents of which are hereby incorporated by reference.

FIELD

The present invention relates to an energy storage device and a conductive member.

BACKGROUND

In recent years, rechargeable and dischargeable energy storage devices have been adopted as power sources of vehicles (such as an automobile and a motorcycle) and various devices (such as a portable terminal and a laptop computer). The energy storage devices include, for example, batteries (such as a lithium ion battery and a nickel-hydrogen cell) or capacitors (such as an electric double layer capacitor)

For example, the battery includes an electrode assembly and a case. The case includes a case body, which houses the electrode assembly, and a cover plate, which covers an opening of the case body. The electrode assembly and a current collector, which is coupled to the electrode assembly, are disposed within the case. An external terminal is disposed, for example, on an outer surface of the cover plate. The external terminal and the current collector are directly or indirectly coupled together. This electrically couples the external terminal and the electrode assembly together.

As a member that electrically couples the external terminal and the current collector, for example, a conductive member is used. The conductive member includes, for example, a body, an auxiliary terminal, and a coupling conductor. The auxiliary terminal includes a first swage portion, which protrudes from a lower surface of the body, and a second swage portion, which protrudes from a top surface of the body. The coupling conductor includes two through holes. The second swage portion of the auxiliary terminal is inserted into one through hole. A shaft portion of the external terminal is inserted into the other through hole.

A battery described in JP-A-2010-097764 (Patent Literature 1) includes an auxiliary terminal (8), an external terminal (4), and a coupling conductor (9). The auxiliary terminal includes a body (a pedestal portion (8a)), a first swage portion (a first swage tube (8b)), and a second swage portion (a second swage tube (8c)). The external terminal (4) includes a head (a pedestal portion (4a)) and a male threaded portion (a bolt portion (4b)). The coupling conductor (9) includes through holes (a swage hole (9a) and a terminal through hole (9b)).

The auxiliary terminal is disposed on an outer surface of a cover plate (3) via a sealing member (an external insulation sealing member (6)). This allows insertion of the first swage portion of the auxiliary terminal into a through hole of a current collector (a current collecting connector (5)) within a case. A distal end of the first swage portion that protrudes downward from the through hole is swaged from a lower side.

The external terminal is disposed on the outer surface of the cover plate via the sealing member or a terminal retainer disposed separately from the sealing member. The second swage portion of the auxiliary terminal and the male threaded portion of the external terminal are inserted into the respective through holes of the coupling conductor. A distal end of the second swage portion that protrudes upward from the one through whole (the swage hole (9a)) is swaged from an upper side. This electrically couples the external terminal and the current collector together via the auxiliary terminal and the coupling conductor.

Incidentally, in the battery described in Patent Literature 1, the second swage portion inserted into the through hole of the coupling conductor is swaged. This swaging integrates the auxiliary terminal and the coupling conductor together. Subsequently, the first swage portion is inserted into a wall surface (partition) of the case. The first swage portion, which is inserted into the wall surface of the case and the through hole of the current collector, is swaged. At this time, the auxiliary terminal and the coupling conductor, which are integrated together, may be rotated around a rotation axis in the insertion direction by a swaging force generated when the first swage portion is swaged. Thus, the coupling conductor may be displaced from a desired position.

This type of problem may occur not only in batteries but also in capacitors (such as a double layer capacitor) as well.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention has been made in view of the above-described problem. One object of the present invention is to provide an energy storage device and a conductive member that suppress or prevent rotation of a conductive member with respect to a case when the conductive member is swaged.

An energy storage device according to an aspect of the present invention includes: an electrode assembly that includes a positive electrode plate and a negative electrode plate, the positive electrode plate and the negative electrode plate being mutually insulated; a case that houses the electrode assembly; and a conductive member electrically coupled to the electrode assembly in the case. The conductive member includes a main body part that has a central axis in a direction passing through a wall surface of the case, and a conductive connection part that protrudes from the main body part in a direction intersecting with the central axis. The main body part includes a swage portion disposed at one end portion of the main body part and inserted into the wall surface of case, and a non-circular head disposed at another end portion of the main body part.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
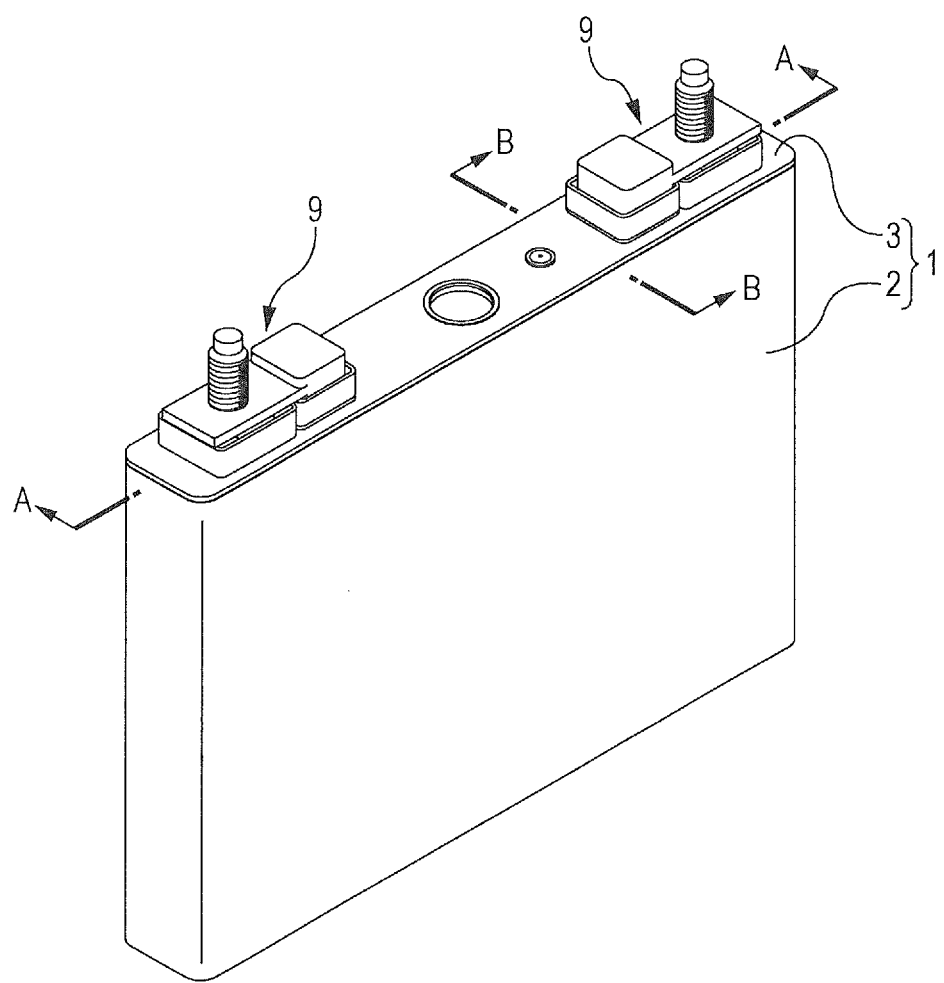
FIG. 1 is a perspective view of a battery according to an embodiment of the present invention.
Figure 2:
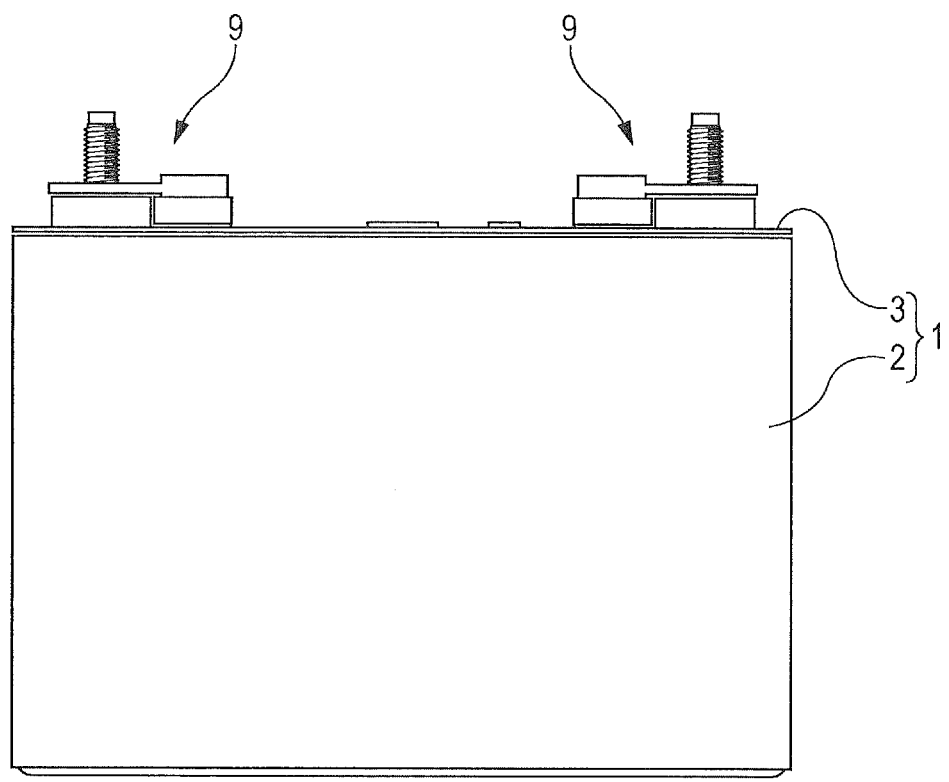
FIG. 2 is a side view of the battery.
Figure 3:
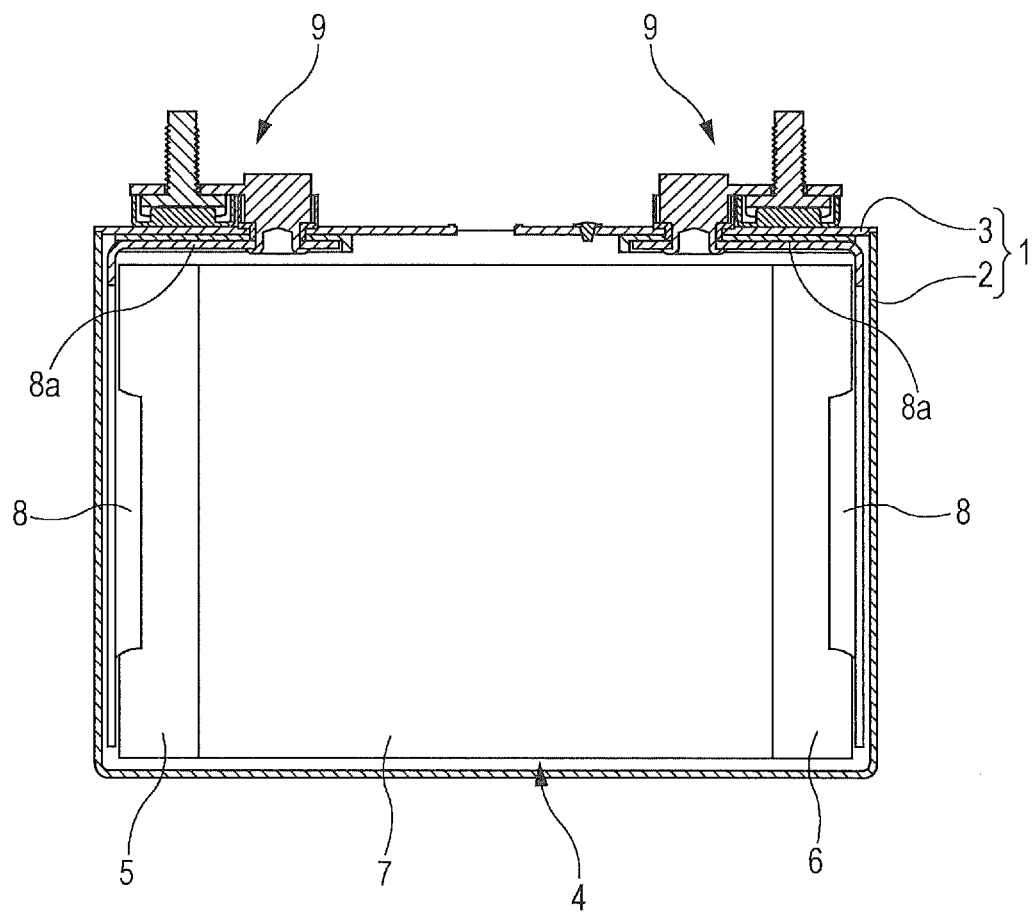
FIG. 3 is a cross-sectional view of the battery taken along the line A-A in FIG. 1.
Figure 4:
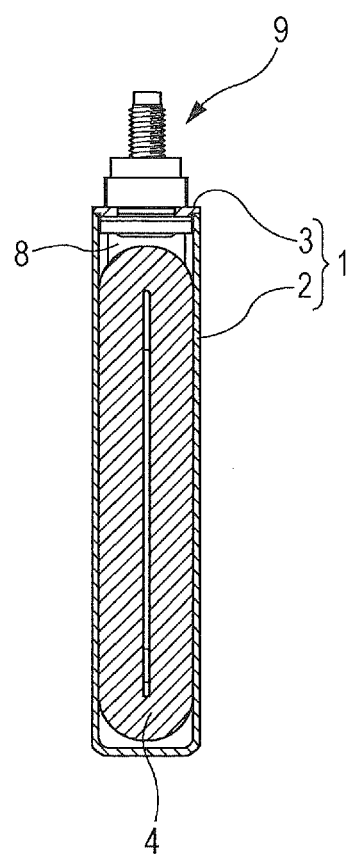
FIG. 4 is a cross-sectional view of the battery taken along the line B-B in FIG. 1.

An energy storage device according to an aspect of the present invention includes: an electrode assembly that includes a positive electrode plate and a negative electrode plate, the positive electrode plate and the negative electrode plate being mutually insulated; a case that houses the electrode assembly; and a conductive member electrically coupled to the electrode assembly in the case. The conductive member includes a main body part that has a central axis in a direction passing through a wall surface (partition) of the case, and a conductive connection part that protrudes from the main body part in a direction intersecting with the central axis. The main body part includes a swage portion disposed at one end portion of the main body part and inserted into the wall surface of case, and a non-circular head disposed at another end portion of the main body part.

With this configuration, the head of the main body part has a non-circular shape. This allows supporting the head by a tool such as an industrial tool and a jig. Accordingly, in this energy storage device, the swage portion is swaged in a state where the head is supported. This suppresses and restricts rotation of the conductive member around the central axis by a swaging force generated when the swage portion is swaged. This suppresses or prevents rotation of the conductive member with respect to the case during swaging.

With this configuration, the conductive connection part is expanded (extended) in a direction away from the main body part. This sufficiently ensures coupling space for a conductor with respect to the conductive connection part.

Another aspect of this energy storage device may further include an insulating member. This insulating member is disposed along the wall surface. The insulating member has a through hole through which the swage portion passes, and supports the conductive member.

With this configuration, the conductive member and the partition are insulated from each other by the insulating member. In this state, the conductive member and the electrode assembly are electrically coupled together.

In this case, the main body part may further include a body between the swage portion and the head. Additionally, the insulating member may include a depressed portion that can receive the body.

With this configuration, even in the case where this energy storage device is exposed to water droplets generated by condensation and the like or to a conductive atmosphere (such as static electricity and dust), the outer wall part of the insulating member functions as a cover (or a shield wall). This appropriately suppresses or prevents a short circuit between the case and the main body part.

Additionally in this case, the head and the body may have approximately the same shape in a cross section approximately perpendicular to the central axis.

This configuration suppresses or prevents generation of unnecessary level difference between the head and the body.

In another aspect of this energy storage device, the head may have a multangular shape with a rounded corner portion.

With this configuration, the head has a multangular shape and thus the head can be reliably supported by a tool. Additionally, the rounded corner portion of the head suppresses or prevents a locally high value of electrical resistance in this portion.

Additionally, in another aspect of this energy storage device, the swage portion may be inserted into the wall surface of case from an outside toward an inside of the case. The conductive connection part may be disposed outside of the case.

With this configuration, the swage portion is swaged from the inside of the case to secure the conductive member to the case. On the other hand, the conductor is coupled to a portion outside of the case in the conductive connection part.

In this case, this energy storage device may further include an external terminal disposed outside of the case. The conductive connection part may be electrically coupled to the external terminal.

With this configuration, the external terminal as a conductor is coupled to the conductive connection part. The external terminal is coupled to, for example, a crimping terminal of lead wire of an external device.

In another aspect of this energy storage device, the swage portion may be inserted into the wall surface of case from an inside toward an outside of the case. The conductive connection part may be disposed in the case and electrically coupled to the electrode assembly.

With this configuration, the swage portion is swaged from the outside of the case to secure the conductive member to the case. On the other hand, the conductor is coupled to the electrode assembly inside of the case.

Additionally, in another aspect of this energy storage device, the conductive member may be formed by forging.

With this configuration, the conductive member can be produced at low cost. This consequently reduces the production cost.

A conductive member according to the present invention includes a main body part and a conductive connection part. The main body part has a central axis in a direction passing through a wall surface of a case of an energy storage device, and is electrically coupled to an electrode assembly of the energy storage device. The conductive connection part protrudes from the main body part in a direction intersecting with the central axis. The main body part includes a swage portion and a non-circular head. The swage portion is disposed at one end portion of the main body part, and is inserted into the wall surface of case. The non-circular head is disposed at another end portion of the main body part.

As above, with the present invention, the main body part includes the non-circular head. This suppresses or prevents rotation of the conductive member with respect to the case when the swage portion is swaged.

Hereinafter, a battery that is a first embodiment of an energy storage device according to the present invention will be described with reference to the drawings. The battery (a first battery) according to this embodiment is, for example, a non-aqueous electrolyte secondary battery. More specifically, the first battery is a lithium ion secondary battery. As illustrated in FIGS. 1 to 4, the battery includes a case 1 which includes a case body 2 and a cover plate 3. The case body 2 has an opening covered with the cover plate 3. This seals the case body 2. The cover plate 3 includes a terminal structure 9. The terminal structure 9 is electrically coupled to an electrode assembly 4 housed in the case 1.

The case body 2 and the cover plate 3 of the case 1 are formed, for example, by aluminum-based metal material such as aluminum or aluminum alloy. In the case body 2, the winding type electrode assembly 4 having an oval cylindrical shape is housed. Accordingly, the case body 2 is a closed-end rectangular tube that is flat in a width direction. The cover plate 3 is a rectangular plate having a shape corresponding to the opening of the case body 2. The cover plate 3 engages the opening of the case body 2 and is secured by, for example, laser beam welding. This seals and secures the case body 2.

The electrode assembly 4 is formed by winding a strip-shaped sheet in an oval cylindrical shape. This strip-shaped sheet includes a strip-shaped positive electrode sheet 5, a strip-shaped negative electrode sheet 6, and a strip-shaped separator 7 sandwiched between these sheets. The positive electrode sheet 5 and the negative electrode sheet 6 are each displaced in the lateral direction of the separator 7. Around an axis along a lateral direction of the strip-shaped sheet as a rotation axis, the sheet is wound to form an oval cylindrical shape that is long in a vertical direction. This forms the electrode assembly 4.

The entire electrode assembly 4 is covered with an insulating cover (not shown) made of an insulating sheet. The electrode assembly 4 is housed in the case 1 while being insulated from the case 1. The positive electrode sheet 5 is, for example, an aluminum foil that supports a positive electrode active material on a surface of the aluminum foil. The negative electrode sheet 6 is, for example, a copper foil that supports a negative electrode active material on a surface of the copper foil. An end edge portion of the positive electrode sheet 5 and an end edge portion of the negative electrode sheet 6 that each protrude from the separator 7 each include a non-coated portion where the active material is not coated.

This exposes the aluminum foil or the copper foil in right and left end portions of the electrode assembly 4. That is, the respective metal foils of the electrode sheets 5 and 6 protrude in a wound shape formed by winding.

The respective metal foils protruding from the right and left end portions of the electrode assembly 4 are electrically coupled to a current collector 8. The current collector 8 has a long shape in the vertical direction. The current collector 8 is, for example, a conductive metal member. More specifically, the current collector 8 for the positive electrode is formed of, for example, aluminum or aluminum alloy. The current collector 8 for the negative electrode is formed of, for example, copper or copper alloy. An upper portion of the current collector 8 is horizontally bent to serve as a connection part 8a. A lower portion from the connection part 8a is divided into two parts and protrudes downward. This portion divided into two parts is sandwiched between holding plates (not shown) together with the end portion of the electrode assembly 4. The two portions of the current collector 8, the end portion of the electrode assembly 4, and the holding plates are coupled and secured together by, for example, ultrasonic welding.

Figure 5:
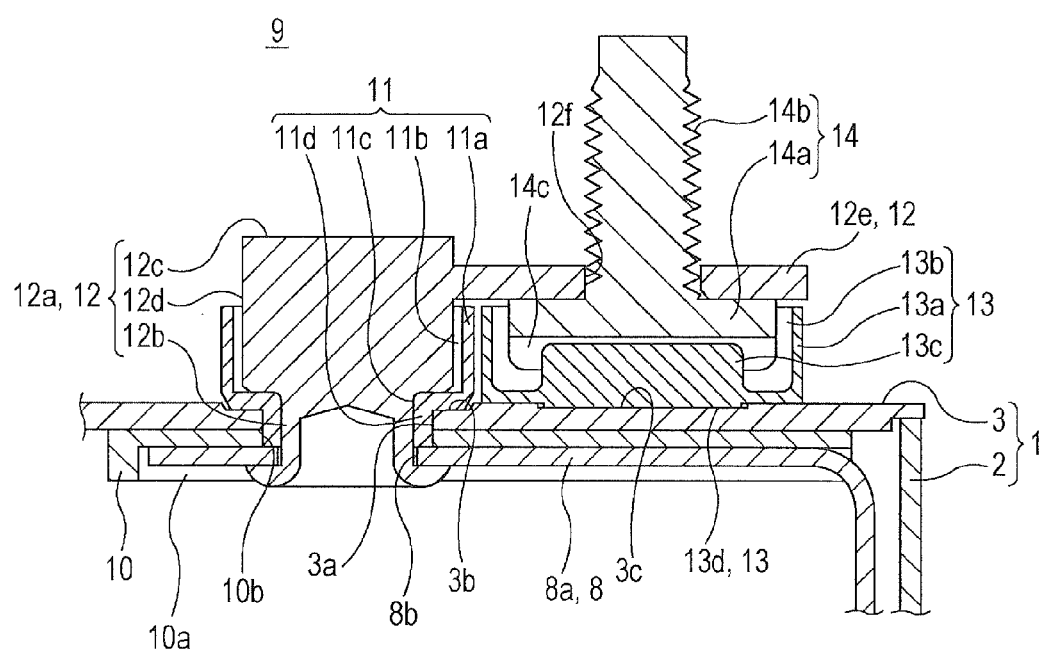
FIG. 5 is an enlarged cross-sectional view of a terminal structure of the battery.

The terminal structures 9 include a terminal structure 9 for a positive electrode and a terminal structure 9 for a negative electrode. The terminal structures 9 each include, as specifically illustrated in FIGS. 5 to 7, a resin plate 10, an outer gasket 11, a conductive member 12, a terminal retainer 13, and a terminal bolt 14. Two through holes 3a formed at the right and left end portions of the cover plate 3 are sandwiched by the resin plate 10 and the outer gasket 11 from the inside and the outside.

The conductive member 12 is inserted into the through hole 3a via the resin plate 10 and the outer gasket 11. The conductive member 12 is electrically coupled to the connection part 8a of the current collector 8. The terminal retainer 13 is disposed close to the outer gasket 11. The terminal bolt 14 is disposed on an outer surface of the cover plate 3 via the terminal retainer 13. The terminal bolt 14 is electrically coupled to the conductive member 12. Accordingly, the electrode assembly 4 in the case 1 and the terminal bolt 14 are electrically coupled together.

The resin plate 10, the outer gasket 11, and the terminal retainer 13 each have insulation function. That is, these members correspond to an insulating member. Especially, the outer gasket 11 (possibly also the resin plate 10) has a sealing function. That is, the outer gasket 11 (possibly also the resin plate 10) also corresponds to the sealing member. The terminal bolt 14 corresponds to an external terminal.

Figure 7:
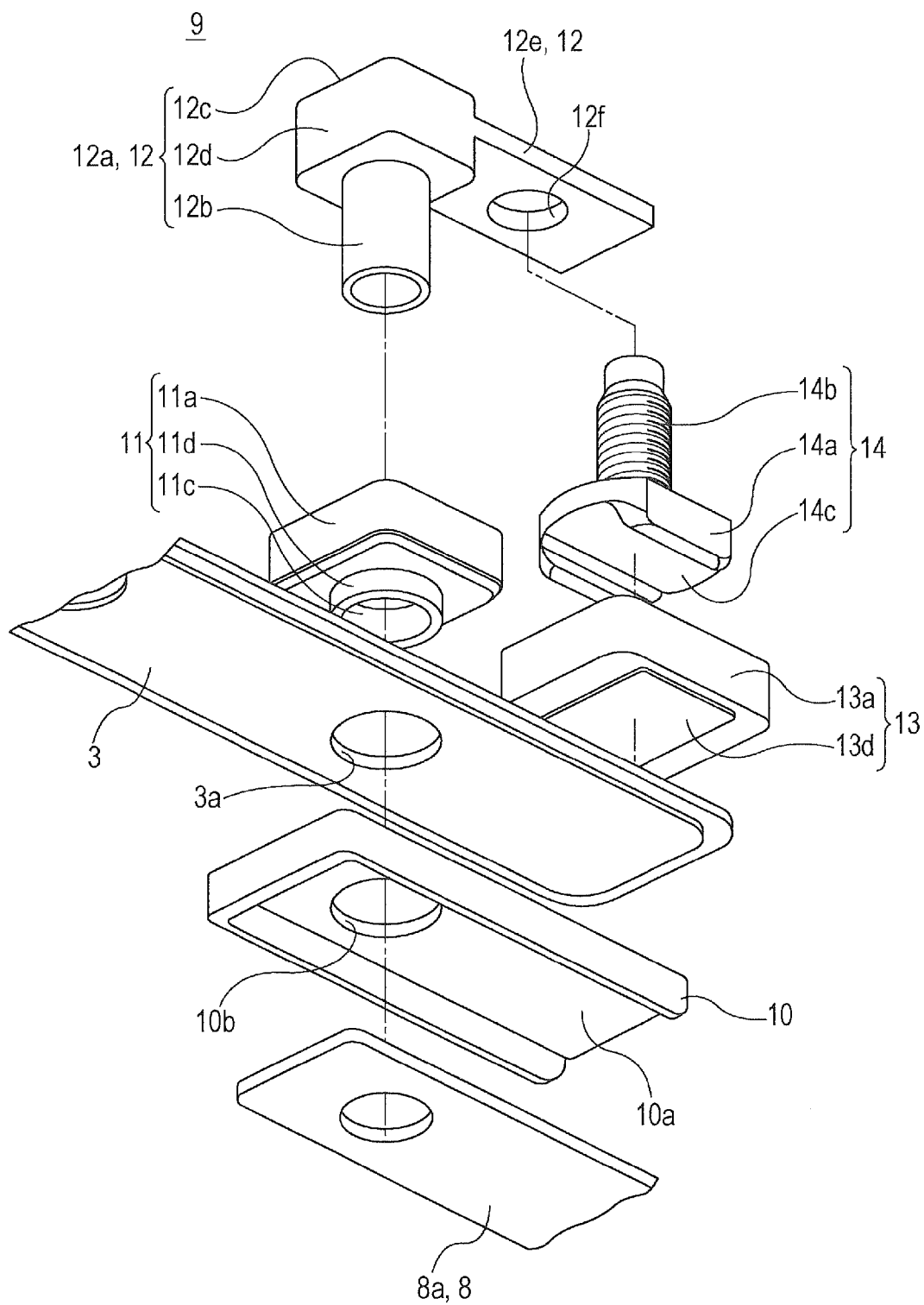
FIG. 7 is an exploded perspective view of the terminal structure in bottom view of the battery.

The resin plate 10 is, for example, a synthetic resin member with an insulating property. More specifically, the resin plate 10 employs, for example, a thermoplastic resin material. The thermoplastic resin material is obtained, for example, by approximately uniformly mixing polyphenylene sulfide (PPS) resin with polyolefin-based elastomer made of at least one of polyethylene (PE) and polypropylene (PP). The resin plate 10 has a rectangular shape. As illustrated in FIG. 7, the resin plate 10 includes a lower surface where a depressed portion 10a is formed. The depressed portion 10a fits the connection part 8a of the current collector 8. The resin plate 10 has a through hole 10b that approximately coincides with a through hole 8b of the connection part 8a when the depressed portion 10a fits the connection part 8a of the current collector 8.

The outer gasket 11 is, for example, a synthetic resin member that has insulation property and sealing property. More specifically, the outer gasket 11 is made of a thermoplastic resin material. This thermoplastic resin material is obtained, for example, by uniformly mixing polyphenylene sulfide (PPS) resin with polyolefin-based elastomer made of at least one of polyethylene (PE) and polypropylene (PP). The outer gasket 11 has a slightly larger rectangular shape than that of a body 12d (described below) of the conductive member 12.

Figure 6:
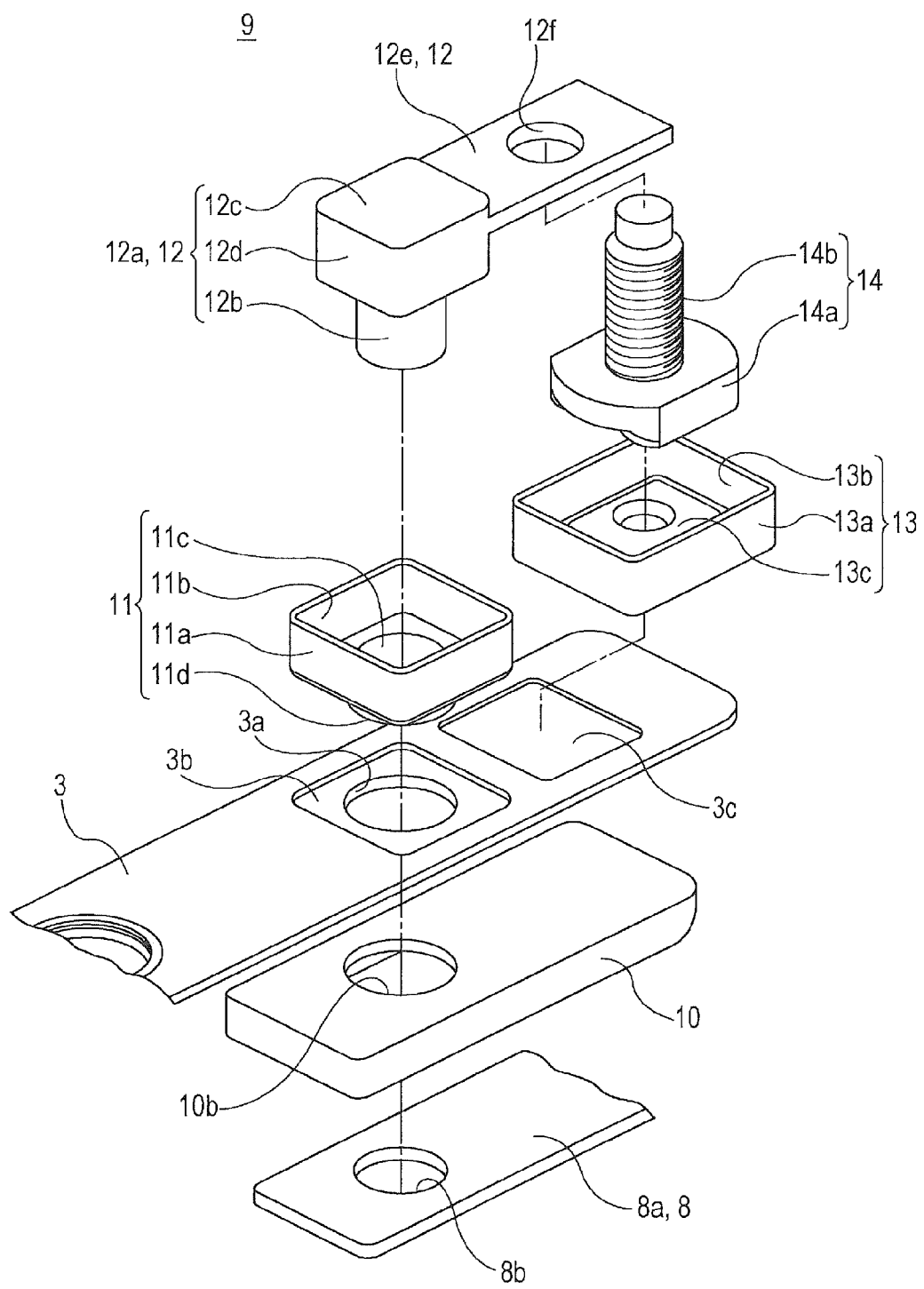
FIG. 6 is an exploded perspective view of the terminal structure in top view of the battery.

As illustrated in FIG. 6, a top surface of the outer gasket 11 is depressed to have a depressed shape. Accordingly, the outer gasket 11 includes a surrounding peripheral outer wall part 11a. At an inner side of the outer wall part 11a of the outer gasket 11, a depressed portion 11b is disposed. The depressed portion 11b fits the body 12d of the conductive member 12. Into a through hole 11c of the outer gasket 11, a swage portion 12b (described below) of the conductive member 12 is inserted when the body 12d of the conductive member 12 fits the depressed portion 11b. On a lower surface of the outer gasket 11, a ring-shaped protrusion 11d is formed. The ring-shaped protrusion 11d is inserted to the through hole 3a of the cover plate 3, thus being inserted into the through hole 10b of the resin plate 10.

The resin plate 10 is disposed within the case 1 while being disposed on a lower surface (an inner surface side) of the cover plate 3. The outer gasket 11 is disposed on an outer surface of the case 1 while being disposed on a top surface (an outer surface side) of the cover plate 3. A portion where the outer gasket 11 is disposed on the top surface of the cover plate 3 includes a non-circular depressed portion (a first depressed portion) 3b to fit a lower portion (a bridge portion) of the outer gasket 11. This first depressed portion 3b fits the lower portion (a joining surface with the cover plate 3) of the outer gasket 11. This suppresses and restricts axial rotation of the outer gasket 11. in this embodiment, a shape of the lower portion of the outer gasket 11 has a rectangular shape. Correspondingly, the first depressed portion 3b is formed in a rectangular shape. The first depressed portion 3b is formed, for example, by coining.

The conductive member 12 is, for example, a conductive metal member. More specifically, the conductive member 12 for the positive electrode is formed of, for example, aluminum or aluminum alloy. The conductive member 12 for the negative electrode is formed of, for example, copper or copper alloy. As illustrated in FIG. 6, the conductive member 12 includes a main body part 12a and a conductive connection part 12e. The main body part 12a has the central axis extending in a direction passing through the cover plate (wall surface, partition) 3. The conductive connection part 12e protrudes from the body 12d of the main body part 12a in a direction intersecting with the central axis. The main body part 12a corresponds to the auxiliary terminal in the background art. The conductive connection part 12e corresponds to the coupling conductor in the background art.

The main body part 12a includes the swage portion 12b at a side inserted into the cover plate 3. That is, the swage portion 12b is disposed at one end portion of the main body part 12a. The main body part 12a includes a head 12c in a non-circular shape around the central axis at the opposite side of the side inserted into the cover plate 3. That is, the head 12c is disposed at the other end portion of the main body part. The main body part 12a includes the body 12d between the swage portion 12b and the head 12c.

The swage portion 12b protrudes downward from a lower surface of the body 12d. In this embodiment, the swage portion 12b has a hollow shape (a tubular shape). More specifically, the swage portion 12b has a cylindrical shape. However, the shape of the swage portion 12b is not limited to this. The shape of the swage portion 12b may be a solid shape (a pillar shape), or may be, more specifically, a columnar shape.

The head 12c extends from the body 12d in the central axis direction. The head 12c is formed in a flat planar shape parallel to the cover plate 3. That is, in a direction where the conductive connection part 12e protrudes from the body 12d, a level difference is formed between the head 12c and the conductive connection part 12e. The head 12c has a prismatic shape where respective corner portions at four corners are rounded in a view from the central axis direction. The head 12c may have a circular shape in the view from the central axis direction. The head 12c may be formed in a position displaced from the central axis. In this case, the head 12c has a non-circular shape around the central axis. The head 12c functions as a rotation stopper for the conductive member 12 when the swage portion 12b is swaged.

The body 12d and the head 12c have respective cross sections approximately perpendicular to the central axis in the same shape or approximately the same shape. That is, the body 12d has, similarly to the head 12c, a multangular shape where respective corner portions are rounded in a view from the central axis direction. Also in a direction intersecting with the central axis, the shape of the body 12d and the shape of the head 12c approximately coincide with each other. Accordingly, there is no level difference between a side surface of the body 12d and a side surface of the head 12c as one continuous flat surface. A length of the body 12d in the central axis direction has a thickness to bear a force applied when the swage portion 12b is swaged.

The conductive connection part 12e is, in this embodiment, formed in a rectangular plate shape. A surface of the conductive connection part 12e is processed by a surface treatment such as nickel plating and zinc plating for preventing rust and for improving slipperiness. The conductive connection part 12e protrudes from the main body part 12a in a direction intersecting with the central axis. The conductive connection part 12e includes one end portion where a through hole 12f is formed. A shaft portion 14b of the terminal bolt 14 is inserted into the through hole 12f.

In this embodiment, the conductive member 12 is formed, for example, by forging. Especially, the conductive member 12 is preferred to be formed by cold forging. However, a method for producing the conductive member 12 is not limited to this. For example, the main body part 12a and the conductive connection part 12e may be produced as independent components. In this case, the main body part 12a and the conductive connection part 12e may be integrated together, for example, by welding Here, a description will be given of a dimensional relationship among the through hole 3a of the cover plate 3, the through hole 8b of the connection part 8a of the current collector 8, the through hole 10b of the resin plate 10, the through hole lie and the ring-shaped protrusion 11d of the outer gasket 11, and the swage portion 12b of the main body part 12a of the conductive member 12. As specifically illustrated in FIG. 5, a dimension of an inner diameter of the through hole 3a at the cover plate 3 and a dimension of an inner diameter of the through hole 10b at the resin plate 10 are the same or approximately the same. The dimension of the inner diameter of the through hole 3a at the cover plate 3, the dimension of the inner diameter of the through hole 10b at the resin plate 10, and a dimension of an outer diameter of the ring-shaped protrusion 11d at the outer gasket 11 are the same or approximately the same.

Additionally, a length dimension in an axial direction of the ring-shaped protrusion 11d at the outer gasket 11 and a sum of thickness dimensions of the cover plate 3 and the resin plate 10 are the same or approximately the same. The dimension of the inner diameter of the ring-shaped protrusion 11d at the outer gasket 11 and the dimension of the inner diameter of the through hole 8b of the connection part 8a at the current collector 8 are the same or approximately the same. The dimension of the inner diameter of the ring-shaped protrusion 11d at the outer gasket 11, the dimension of the inner diameter of the through hole 8b of the connection part 8a at the current collector 8, and a dimension of an outer diameter of the swage portion 12b at the main body part 12a of the conductive member 12 are the same or approximately the same. A length dimension in an axial direction of the swage portion 12b at the main body part 12a of the conductive member 12 is the same or approximately the same as a sum of thickness dimensions of the cover plate 3, the connection part 8a of the current collector 8, the resin plate 10, and the outer gasket 11.

Accordingly, the body 12d at the main body part 12a of the conductive member 12 is inserted into the depressed portion 1 lb of the outer gasket 11 from the outside toward the inside of the cover plate 3. The swage portion 12b at the main body part 12a of the conductive member 12 passes through the through hole 11c on a bottom surface of the depressed portion 1 lb of the outer gasket 11, and then is inserted into the through hole 8b at the connection part 8a of the current collector 8. A distal end of the swage portion 12b that protrudes downward from the through hole 8b at the connection part 8a of the current collector 8 is swaged from a lower side. Thus, the conductive member 12 (the swage portion 12b and the main body part 12a) is electrically coupled to the connection part 8a of the current collector 8. Furthermore, the conductive member 12 is mounted on the cover plate 3 in a state insulated from the cover plate 3.

The terminal retainer 13 is, similarly to the resin plate 10 and the outer gasket 11, a synthetic resin member with insulation property for example. The terminal retainer 13 has a slightly larger rectangular shape than that of a head 14a of the terminal bolt 14. As illustrated in FIG. 6, a top surface of the terminal retainer 13 is depressed to have a depressed shape. Accordingly, the terminal retainer 13 includes a surrounding peripheral outer wall part 13a. At an inner side of the outer wall part 13a of the terminal retainer 13, a depressed portion 13b is disposed. The depressed portion 13b fits the head 14a of the terminal bolt 14.

The terminal retainer 13 includes a non-circular fitting protrusion 13c in the depressed portion 13b. The depressed portion 13b fits the head 14a of the terminal bolt 14. At this time, the fitting protrusion 13c fits in a non-circular fitting depressed portion (a fitting depressed groove) 14c formed in the head 14a of the terminal bolt 14. The fitting protrusion 13c is disposed in a lower position than that of a top end surface of the outer wall part 11a in the depressed portion 13b. Accordingly, the fitting protrusion 13c fits in the fitting depressed portion 14c at the head 14a of the terminal bolt 14. Accordingly, the terminal retainer 13 receives the terminal bolt 14 such that axial rotation of the terminal retainer 13 is suppressed or restricted.

As illustrated in FIG. 7, a non-circular protrusion 13d is formed on a lower surface of the terminal retainer 13. In this embodiment, the protrusion 13d is a rectangular protruding surface (raised surface). On the top surface of the cover plate 3, in a portion where the terminal retainer 13 is disposed, as illustrated in FIG. 6, a non-circular depressed portion (a second depressed portion) 3c is formed. The non-circular depressed portion 3c fits the protrusion 13d of the terminal retainer 13. Accordingly, the protrusion 13d of the terminal retainer 13 fits the second depressed portion 3c. Similarly to the outer gasket 11, this suppresses or restricts axial rotation of the terminal retainer 13. In this embodiment, the second depressed portion 3c is formed in a rectangular shape, corresponding to the protrusion 13d in a rectangular shape. The second depressed portion 3c is formed, for example, by coining.

The terminal bolt 14 is electrically coupled to an external device. A material of the terminal bolt 14 is, for example, iron, steel such as stainless steel and chromium-molybdenum steel, and other conductive metal member with high strength. The terminal bolt 14 includes, as described above, the head 14a and the shaft portion 14b. The head 14a is formed in a size to be inserted into the depressed portion 13b of the terminal retainer 13. The shaft portion 14b protrudes from a top surface of the head 14a. The shaft portion 14b has an outer periphery where a male thread is engraved. As described above, on a lower surface of the head 14a, the non-circular fitting depressed portion (the fitting depressed groove) 14c is formed. The fitting protrusion 13c in the depressed portion 13b fits in the fitting depressed portion 14c of the terminal bolt 14. Thus, the terminal bolt 14 is insulated from the cover plate 3, and supported by the terminal retainer 13 in a state where axial rotation of the shaft portion 14b is suppressed or restricted.

In the terminal bolt 14, the shaft portion 14b is inserted into the through hole 12f of the conductive connection part 12e. The shaft portion 14b of the terminal bolt 14 fits, for example, a crimping terminal (not shown) of lead wire of the external device, and additionally the shaft portion 14b is fastened by a nut. In this case, the terminal bolt 14 is slightly lifted. As a result, the top surface of the head 14a is brought into pressure contact with a lower surface of the conductive connection part 12e of the conductive member 12. Thus, the head 14a of the terminal bolt 14 and the nut sandwich the crimping terminal of the lead wire and the conductive connection part 12e. This ensures an electrical coupling among the crimping terminal, the terminal bolt 14, and the conductive connection part 12e. Accordingly, the crimping terminal of the lead wire is electrically coupled to the electrode assembly 4 via the terminal bolt 14, the conductive member 12, and the current collector 8. This electrically couples the external device and this battery together. The terminal bolt 14, the conductive member 12, and the current collector 8 are insulated from the cover plate 3 by the terminal retainer 13, the outer gasket 11, and the resin plate 10.

The fitting depressed portion 14c at the head 14a of the tee Anal bolt 14 fits the fitting protrusion 13c in the depressed portion 13b of the terminal retainer 13 secured to the top surface of the cover plate 3. This effectively suppresses rotation of the terminal bolt 14 together with the nut when the shaft portion 14b of the terminal bolt 14 is fastened by a nut.

Thus, in the conductive member 12 according to this embodiment, the main body part 12a and the conductive connection part 12e are integrated together. The body 12d of the main body part 12a fits the depressed portion 11b of the outer gasket 11. The swage portion 12b of the main body part 12a is inserted into the through hole 11c of the outer gasket 11. The swage portion 12b protruding downward from the through hole 11c of the outer gasket 11 passes through the through hole 3a of the cover plate 3 and the through hole 10b of the resin plate 10. The swage portion 12b is inserted into the through hole 8b at the connection part 8a of the current collector 8.

On the other hand, at the case 1 side of the conductive connection part 12e, the terminal retainer 13 is disposed on the second depressed portion 3c of the cover plate 3. The head 14a of the terminal bolt 14 fits the depressed portion 13b of the terminal retainer 13. The shaft portion 14b of the terminal bolt 14 is inserted into the through hole 12f. Consequently, this electrically couples the terminal bolt 14, which is an external terminal, and the connection part 8a of the current collector 8 in one process.

In the conductive member 12 according to this embodiment, the head 12c of the main body part 12a has approximately a prismatic shape. This allows supporting the head 12c by a tool such as an industrial tool and a jig. That is, in a state where the head 12c is held by a tool such as an industrial tool and a jig, this allows swaging of the swage portion 12b at the main body part 12a.

The head 12c has a non-circular shape around the central axis. Accordingly, in the case where a swaging force generated when the swage portion 12b is swaged attempts to rotate the conductive member 12 around the central axis, this rotation is suppressed or restricted by the tool such as an industrial tool and a jig. This suppresses or prevents the conductive member 12 from rotating with respect to the cover plate 3 during swaging.

In the conductive member 12 according to this embodiment, in a state where the main body part 12a and the conductive connection part 12e are integrated together, the swage portion 12b of the main body part 12a is swaged. Accordingly, after the swage portion 12b is swaged, this prevents application of a new swaging force to the conductive member 12. This suppresses or prevents loss of air tightness in a portion of the cover plate 3 through which the swage portion 12b of the conductive member 12 passes.

The energy storage device according to the present invention is not limited to the above-described embodiment, and various changes of the embodiment may be made without departing from the spirit and scope of the present invention.

For example, in the above-described embodiment, the current collector 8 for the positive electrode and the conductive member 12 for the positive electrode are each formed of, for example, aluminum or aluminum alloy. The current collector 8 for the negative electrode and the conductive member 12 for the negative electrode is formed of, for example, copper or copper alloy. However, respective materials of the current collector 8 and the conductive member 12 may be any materials insofar as the materials are conductive metal materials appropriate for the type of the battery. Additionally, in the above-described embodiment, the material of the terminal bolt 14 is also described. However, the material of the terminal bolt 14 may be any material insofar as the material is a conductive metal material with appropriate characteristics of, for example, strength and conductive property.

In the above-described embodiment, the shaft portion (the male threaded portion) 14b protrudes from the top surface side of the head 14a of the terminal bolt 14. However, instead of this male thread, a shaft portion in any shape such as a cylindrical shape and a polygonal tubular shape may be protruded. On the top end surface of this shaft portion, a screw hole may be drilled.

Figure 8:
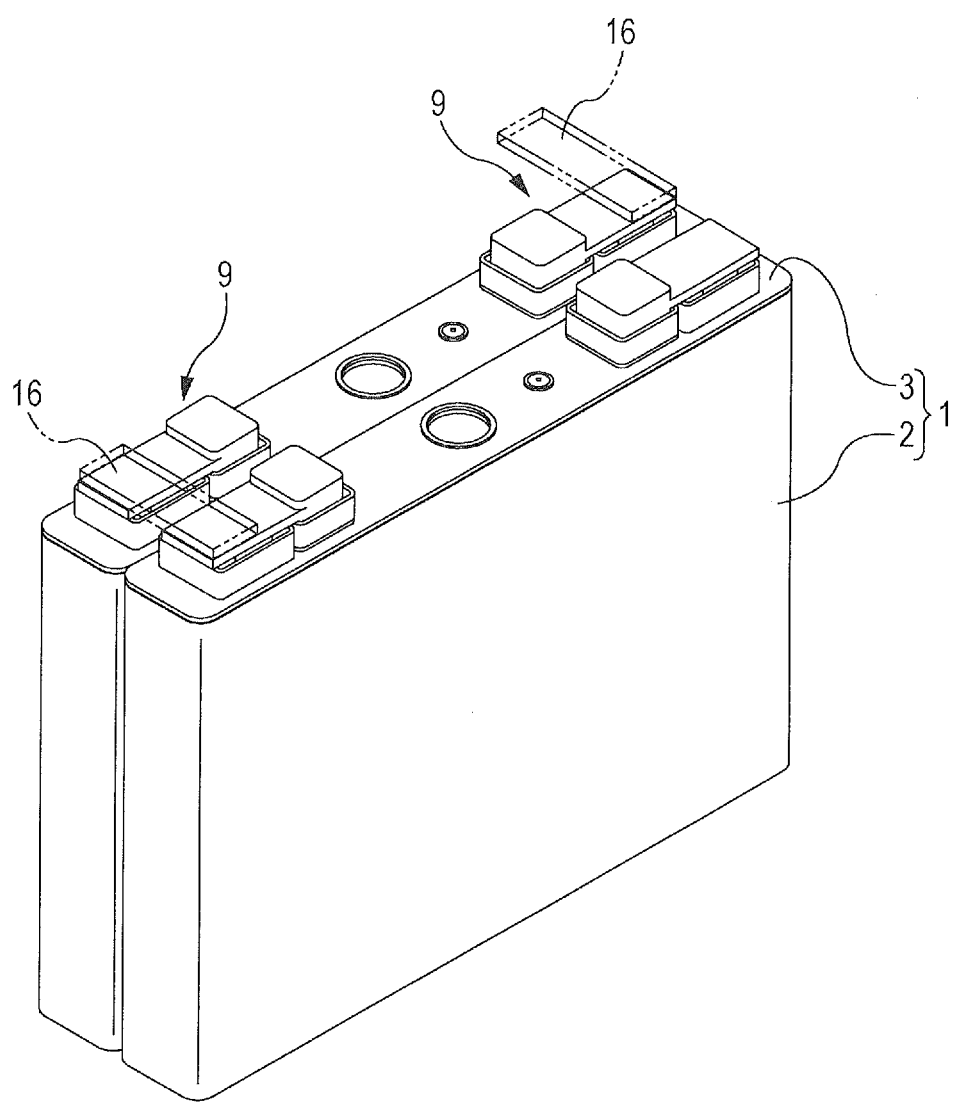
FIG. 8 is a perspective view of a battery according to another embodiment of the present invention.

In the above-described embodiment, the crimping terminal of the lead wire of the external device is fastened to the shaft portion 14b of the terminal bolt 14 by a nut. This electrically couples the external device and the battery. However, as illustrated in FIG. 8, the embodiment of the present invention may be an assembled battery including a plurality of cases (energy storage devices) 1 that are disposed parallel to each other and assembled together. In this case, the conductive member 12 in the terminal structure 9 of one of the cases 1 and the conductive member 12 in the terminal structure 9 of another case 1 may be coupled by a coupling member 16. This couples the cases 1 next to each other.

More specifically, the plurality of adjacent cases 1 is electrically coupled together in series. The conductive members 12 (specifically, the conductive connection parts 12e) in the terminal structures 9 of the adjacent cases 1 may be each welded to, for example, the coupling member 16. Thus, the plurality of cases 1 are bonded and coupled together. The coupling member 16 is preferred to be, for example, a bus bar that includes a conductive metal material formed in a plate shape. One end portion of the coupling member 16 is welded to the conductive member 12 (specifically, the conductive connection part 12e) for the positive electrode in the terminal structure 9 of one of the cases 1. The other end portion of the coupling member 16 is welded to the conductive member 12 (specifically, the conductive connection part 12e) for the negative electrode in the terminal structure 9 of another case 1.

Figure 9:
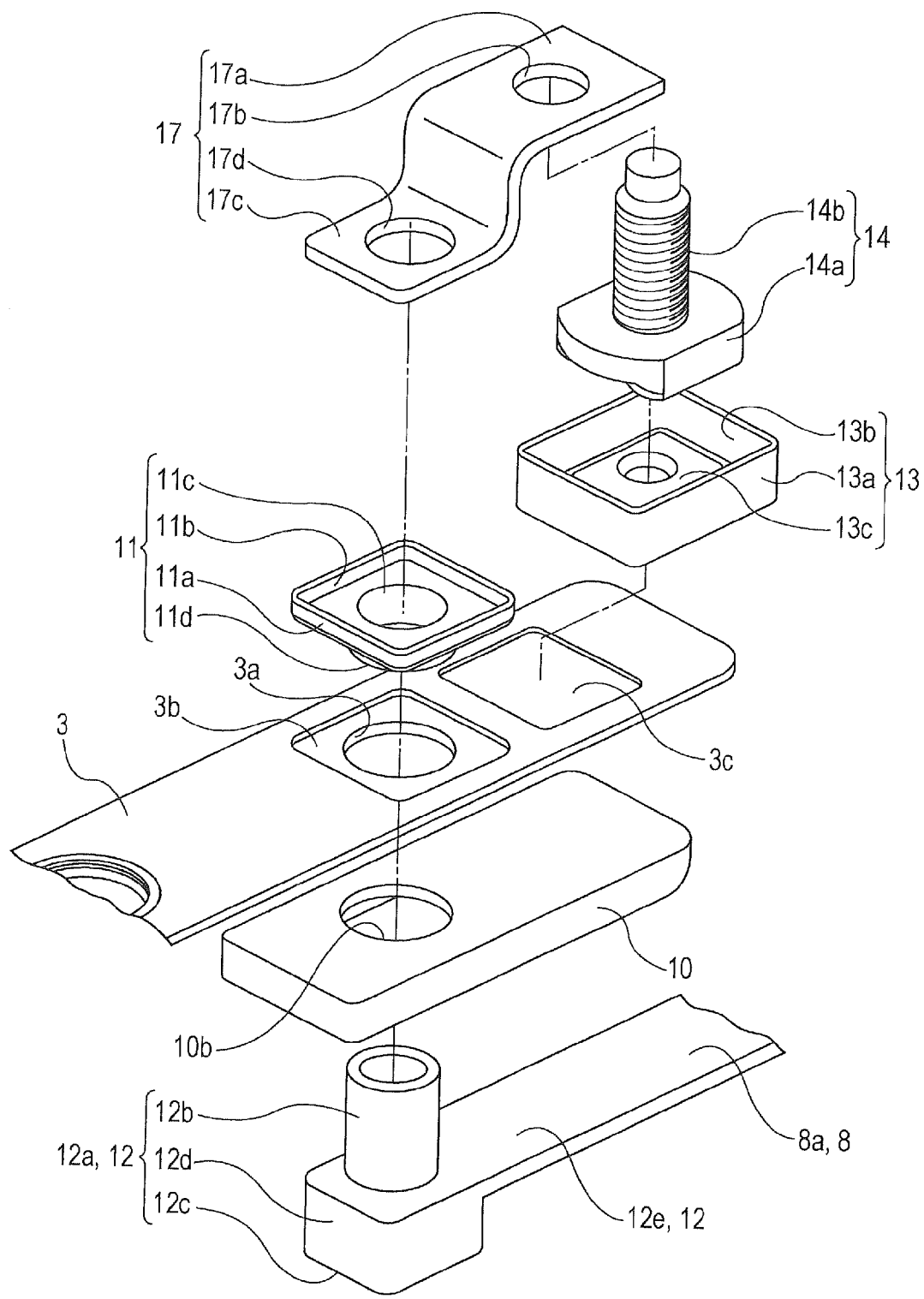
FIG. 9 is an exploded perspective view of a terminal structure in top view of a battery according to another embodiment of the present invention.

In the above-described embodiment, the swage portion 12b at the main body part 12a of the conductive member 12 is inserted into the through hole 3a of the cover plate 3 of the case 1 from the outside toward the inside of the case 1. In this example, the conductive connection part 12e is disposed outside of the case 1. However, as illustrated in FIG. 9, the main body part 12a of the conductive member 12 may be inserted into the through hole 3a at the cover plate 3 of the case 1 from the inside toward the outside of the case 1. In this example, the conductive connection part 12e is disposed inside of the case 1. The conductive connection part 12e (the main body part 12a) is electrically coupled to the current collector 8 (the electrode assembly 4) inside of the case 1. As above, the configuration where the conductive member 12 and the electrode assembly 4 are electrically coupled together is also within the intended scope of the present invention.

More specifically, the shaft portion 14b of the terminal bolt 14 as the external terminal is inserted into the through hole (a first through hole) 17b at the plate portion (the first plate portion) 17a at one end side of the coupling conductor 17 where the level difference is formed. The plate portion (a second plate portion) 17c at the other end side of the coupling conductor 17 is inserted into the depressed portion 11b of the outer gasket 11. The swage portion 12b of the main body part 12a of the conductive member 12 is inserted into the through hole 10b of the resin plate 10, the through hole 3a of the cover plate 3, the through hole 11c of the depressed portion 11b of the outer gasket 11 from the inside toward the outside of the case 1. Furthermore, the swage portion 12b is inserted into the insertion hole (a second insertion hole) 17d of the coupling conductor 17. The distal end of the swage portion 12b protruding upward from the second insertion hole 17d is swaged from the upper side. Accordingly, the main body part 12a of the conductive member 12 electrically couples to the terminal bolt 14. The conductive member 12 is mounted on the cover plate 3 in a state insulated from the cover plate 3.

The conductive connection part 12e may be simply extended to have a function as the current collector 8. Alternatively, in the case where the connection part 8a of the current collector 8 is a conductor, the connection part 8a may be electrically coupled to the conductive connection part 12e. That is, the conductive member 12 and the current collector 8 may have an integrated structure where the conductive connection part 12e and the connection part 8a are coupled together. Alternatively, the conductive connection part 12e and the connection part 8a may be different members separated from each other.

The electrode assembly 4 is not limited to a winding type electrode assembly in an oval cylindrical shape as described in the above embodiment. The electrode assembly 4 may have another shape, and may have a shape of the stacked type.

In the above-described embodiment, the case 1 is formed of, for example, aluminum alloy or steel. However, the material of the case 1 (the case body 2 and the cover plate 3) may be any material.

Therefore, the material of the case 1 may be a material other than metal (such as an insulating material). The shape and the structure of the case 1 (the case body 2 and the cover plate 3) are not limited to the above-described embodiment, and may employ any shape and any structure.

In the above-described embodiment, the terminal structure 9 is disposed at the cover plate 3. However, the terminal structure 9 may be disposed at the case body 2.

In the above-described embodiment, to insulate the terminal bolt 14 and the cover plate 3 from each other, the respective materials of the terminal retainer 13, the outer gasket 11, and the resin plate 10 have insulation properties. However, the respective materials of these members are not limited to this. For example, the partition (the cover plate 3) of the case 1 and the electrode assembly 4 may be electrically coupled together via the conductive member 12. In this case, the terminal retainer 13, the outer gasket 11, or the resin plate 10 may have electrical conductivity. A method for giving electrical conductivity to the terminal retainer 13, the outer gasket 11, or the resin plate 10 includes a method for mixing an electrically conductive material such as carbon with synthetic resin. The embodiment of the present invention needs not include the outer gasket 11 and the resin plate 10. In this case, the conductive member 12 and the cover plate 3 are in direct contact with each other.

In the above-described embodiment, the embodiment of the energy storage device according to the present invention includes lithium ion secondary battery. Any type and any size (capacity) of this battery are possible.

The energy storage device according to the present invention is not limited to the lithium ion secondary battery. The energy storage device according to the present invention is applicable to various types of secondary batteries, primary batteries, or capacitor such as an electric double layer capacitor.

The embodiment of the present invention may employ first to tenth energy storage devices and a first conductive member as follows. The first energy storage device includes an electrode assembly, a case, and a conductive member. The electrode assembly includes a positive electrode plate and a negative electrode plate. The positive electrode plate and the negative electrode plate are mutually insulated. The case is formed of a partition, and houses the electrode assembly. The conductive member passes through the partition, and is electrically coupled to the electrode assembly in the case. The conductive member includes a main body part and a conductive connection part. The main body part has a central axis in a direction passing through the partition. The conductive connection part protrudes from the main body part. The main body part includes a swage portion at a side inserted into the partition and a head in a non-circular shape around the central axis at an opposite side of the side inserted into the partition.

According to a second energy storage device, in the first energy storage device, the conductive connection part protrudes in a direction intersecting with the central axis from the main body part. A third energy storage device further includes an insulating member in the first or second energy storage device. The insulating member is disposed along the partition, and supports the conductive member in a state where the swage portion has passed through the insulating member.

According to a fourth energy storage device, in the third energy storage device, the main body part further includes a body between the swage portion and the head. The insulating member includes a depressed portion that allows receiving the body. According to a fifth energy storage device, in the fourth energy storage device, the head and the body have a same or approximately a same cross-sectional shape around the central axis. According to a sixth energy storage device, in any one of the first to fifth energy storage devices, the head has a prismatic shape with a rounded corner portion.

According to a seventh energy storage device, in the first to sixth energy storage devices, the main body part is inserted into the partition from an outside toward an inside of the case. The conductive connection part is disposed outside of the case. An eighth energy storage device further includes, in the seventh energy storage device, an external terminal disposed outside of the case. The conductive connection part is electrically coupled to the external terminal.

According to a ninth energy storage device, in the first to sixth energy storage devices, the main body part is inserted into the partition from an inside toward an outside of the case. The conductive connection part is disposed in the case and electrically coupled to the electrode assembly. According to a tenth energy storage device, in the first to ninth energy storage devices, the conductive member is formed by forging.

A first conductive member is a conductive member that passes through a partition of a case of a energy storage device, and conductively couples the electrode assembly housed in the case to an outside of the case. The conductive member includes a main body part and a conductive connection part. The main body part has a central axis in a direction passing through the partition. The conductive connection part protrudes from the main body part. The main body part includes a swage portion at a side inserted into the partition, and includes a head in a non-circular shape around the central axis at an opposite side of the side inserted into the partition.

What is claimed is:
1. An energy storage device, comprising: an electrode assembly that includes a positive electrode plate and a negative electrode plate, the positive electrode plate and the negative electrode plate being mutually insulated; a case that houses the electrode assembly; and
   a conductive member electrically coupled to the electrode assembly in the case, wherein the conductive member includes:
   a main body part that has a central axis passing through a wall surface of the case in a direction perpendicular to the wall surface; and
   a conductive connection part that protrudes from the main body part in a direction perpendicular to the central axis,
   wherein the main body part includes:
   a swage portion disposed at one end portion of the main body part and inserted into the wall surface of the case, wherein the swage portion is inserted into the wall surface of the case from an outside toward an inside of the case, wherein the conductive connection part is disposed outside of the case; and
   a non-circular head disposed at another end portion of the main body part, the non-circular head being protruded from the conductive connection part, along the central axis, away from the wall surface; and
   a body between the swage portion and the head,
   wherein the wall surface, the conductive connection part, and the non-circular head are disposed in this order in the direction perpendicular to the wall surface,
   wherein the non-circular head is disposed above an entirety of the conductive connection part,
   wherein the head and the body have approximately a same shape in a cross section approximately perpendicular to the central axis,
   wherein the non-circular head and the conductive connection part are a single piece of the conductive member,
   wherein, in a longitudinal direction of the conductive connection part, from an outer edge of the conductive connection part to another outer edge of the conductive connection part, the conductive connection part extends co-planar and extends parallel to the wall surface; and
   the energy storage device further comprising an external terminal disposed on the outside of the case, wherein the conductive connection part is electrically coupled to the external terminal.

2. The energy storage device according to claim 1, further comprising an insulating member,
   wherein the insulating member is disposed along the wall surface to have a through hole through which the swage portion passes and supports the conductive member.

3. The energy storage device according to claim 2, wherein the insulating member includes a depressed portion that allows receiving the body.

4. The energy storage device according to claim 1, wherein the head has a multi-angular shape with a rounded corner portion.

5. The energy storage device according to claim 1, wherein the conductive member is formed by forging, and
   wherein the non-circular head includes an uppermost surface of the conductive member.

6. The energy storage device according to claim 1, wherein the non-circular head protrudes from the body in a direction parallel to the central axis, and
   wherein, in a plan view from a top surface of the main body part, a shape of the non-circular head coincides with a shape of the body.

7. The energy storage device according to claim 1, wherein the non-circular head protrudes from the body in a direction parallel to the central axis, and
   wherein, in a plan view from a top surface of the main body part, outer edges of the non-circular head overlap with outer edges of the body.

8. The energy storage device according to claim 1, wherein, in a direction parallel to the central axis, a side surface of the non-circular head continuously, as a flat surface, extends along a side surface of the main body part.

9. The energy storage device according to claim 1, wherein the conductive connection part continuously extends between opposing outer edges of the main body.

10. The energy storage device according to claim 1, wherein, with respect to the wall surface, a height of a top surface of the non-circular head is more than a height of an uppermost surface of the conductive connection part.

* * * * *